Patented Feb. 26, 1935

1,992,185

UNITED STATES PATENT OFFICE 1,992,185

AZO DYES

William Stansfield Calcott, Pennsgrove, Francis Hervey Smith, Woodstown, and George Barnhart, Woodbury, N. J., assignors to E. I. du Pont de Nemours & Company, Wilmington, Del., a corporation of Delaware No Drawing. Application March 30, 1932, Serial No. 602,100

7 Claims. (Cl. 8—6)

This invention relates to dyes and more particularly to azo dyes. It especially deals with azo dyes having superior physical properties and methods for their production in such improved state.

In the past azo dyes have been offered to the trade in the form of powders or irregular lumps. These physical forms resulted from the manner in which the azo dyes were produced. The lumps of dye heretofore produced and offered to the trade have been fragile and were easily disintegrated to a powder upon handling. These powders have been objectionable because they dust seriously and wet out with considerable difficulty. Although the azo dye field is one of long standing and is almost as old as the synthetic dye industry itself (which is about 75 years old), no one has as yet succeeded in overcoming the difficulties above pointed out.

It is an object of this invention to overcome the aforementioned difficulties formerly inherent in azo dyes, and in general to advance the art. Other objects are to produce azo dyes in a new physical form; to produce azo dyes having new physical properties; to produce azo dyes in the form of non-dusting flakes or flake-like aggregates; to produce azo dyes in the form of scales, flakes, or platelets; to produce vitreous non-dusting flakes, scales, grains or platelets; to produce glistening, non-dusting azo dyes; to produce azo dyes in the form of masses having appreciable resistance to disintegration; to produce azo dyes in a form which may be readily wetted out in the production of dye liquors; to produce azo dyes of such composition and form that they will be readily soluble; and in general to produce an azo dye product which is more desirable from the commercial standpoint than any heretofore known. Other objects will appear hereinafter.

These objects are accomplished by the present invention whereby the isolated azo dye is formed into an essentially colloidal solution or suspension in a suitable medium, for example water and triethanolamine and thereafter dried by any suitable means, preferably on a rotary drum drier. A water soluble binder may also be added to the suspension before drying.

The invention will be readily understood from a consideration of the following examples:

Example I

Pontamine Black E (Schultz 462), the dyestuff resulting from the coupling of tetrazo benzidine, H-acid, diazo benzene, and m-phenylene diamine in the well known and customary manner was isolated with salt and filtered to give a press cake containing approximately 40% solids. 100 parts of this press cake were suspended in 200 parts of water to which had been added 10 parts of common salt and 20 parts of 36% hydrochloric acid. The suspension was well agitated and then filtered. The filter cake was pasted to a smooth slurry with about 4 parts of 30% caustic soda, 4 parts of trisodium phosphate and 2 parts of triethanolamine, the whole being heated to 60–70° C. to give a thin slurry, which sets to a stiff gel on cooling and thins again on heating. This slurry was then dried on a drum drier, heated with steam at 30–60 pounds per square inch pressure. The dried Pontamine Black E was scraped from the revolving drum in the form of glistening black flakes which were dust-free and readily soluble in water.

Example II

Pontamine Black E, the dyestuff resulting from the coupling of tetrazo benzidine, H-acid, diazo benzene, and meta phenylene diamine in the well known and customary manner was isolated with common salt and filtered to give a press cake containing approximately 40% solids by weight. To 200 parts of this press cake was added with good agitation 75 parts water, 3 parts triethanolamine and 50 parts preserver's syrup. The combination was stirred to give a smooth, thick slurry. This was dried on a drum drier at 40 pounds steam pressure. The dye was scraped off the drier as well defined, glistening flakes of reddish tone. These were readily soluble and dust-free.

Example III

Pontamine Green B (Schultz 474), the dyestuff resulting from coupling diazo para nitraniline, H-acid, tetrazo benzidine, and phenol in the well known and customary manner was isolated with salt and filtered to give a press cake containing approximately 40% solids. 100 parts of the press cake were stirred to a smooth colloidal suspension with 2 parts triethanolamine, 25 parts water and 2½ parts casein. The mass was then dried on an atmospheric drum drier. Water soluble flakes without sheen were obtained.

Example IV

Meta toluylene diamine was diazotized and coupled in the presence of common salt in the customary and well known manner to produce DuPont Basic Brown BR (Schultz 284), in an isolated and readily filterable form. This was then filtered to give a press cake containing about 45% solids by weight. 100 parts of this press cake were stirred with 5 parts preserver's syrup, 1 part of triethanolamine, and 50 parts of water, and the whole was heated to approximately 60° C. to give a smooth slurry. This was then dried on a drum drier at 40 pounds steam pressure, to produce a flaked product of dull appearance.

Example V

Laurents acid was diazotized and coupled to alpha naphthylamine, which combination was diazotized and coupled to phenyl peri acid in the customary and well known manner to form Pontacyl Black BBO (Schultz 265). The resulting dyestuff was isolated and filtered. To 100 parts of the filter cake were added 1½ parts of triethanolamine, 10 parts of preserver's syrup, and 35 parts of water. The combination was warmed to 60° C. with constant agitation to give a viscous colloidal suspension  This was dried on a drum drier at 40 pounds steam pressure to produce a well flaked, readily-soluble, dust-free product of brilliant metallic lustre.

Example VI

Diazosalicylic acid was coupled to alpha naphthylamine and the resulting combination was diazotized and coupled to 1-naphthol-5-sulfonic acid in the customary and well known manner to form Pontachrome Black F (Schultz 275). The dye was isolated and filtered. To 100 parts of the press cake were added with constant agitation 1½ parts of triethanolamine, 50 parts of water, 16 parts of preserver's syrup, and 60 parts common salt to give a slurry of good consistency. This was dried on a drum drier at 40 pounds steam pressure to produce a well defined flake of dull appearance. This was dust-free and readily-soluble in water.

It will be noted that two examples have been cited in which the dye Pontamine Black E was treated. In Example 1 the press cake was slurried with a weak acid brine for the purpose of removing a large part of the salt of the mother liquor contained in the press cake. The relative absence or low concentration of salt permits the dye to form into glistening black flakes without the addition of a binder and in a physical form which is very attractive. In Example 2 the excess salts were not washed out of the press cake and, as an aid to the formation of flakes, the addition of preserver's syrup to the solution or suspension was made. The flakes resulting from the suspension made from the washed press cake were brighter in tone and not as red as the product of the later examples wherein the press cake was not washed.

Under certain conditions the product may be sticky when hot. This may be avoided by any suitable means, as for instance, in Example 6 wherein the Pontachrome Black F was slurried with preserver's syrup as a binder in the presence of common salt. In this instance the flake was thicker than was ordinarily the case.

In the examples given compounds from various classes of azo dyes were used. Additional compounds which may be used with equally satisfactory results are:

| | Schultz |
|---|---|
| Pontamine Blue BB | 337 |
| Pontamine Blue AX | 410 |
| Pontamine Fast Black FF | 436 |
| Pontamine Green GX | 475 |
| Pontamine Brown R | 344 |
| Pontamine Brown D3GN | 476 |
| Pontamine Fast Red F | 343 |
| Pontamine Scarlet B | 319 |
| Metanil Yellow | 134 |
| Pontacyl Sulfur Blue 5R | 257 |
| Pontacyl Blue Black SX | 217 |
| Pontacyl Ruby G | 163 |
| Pontacyl Cloth Red 3G | 230 |
| Pontachrome Black A | 184 |
| Pontachrome Blue Black BB | 180 |
| Pontachrome Black PV | 157 |
| Pontachrome Flavine G | 102 |
| Pontachrome Red B | 202 |
| Basic Brown GX | 283 |
| Chrysoidine G | 33 |
| Chrysoidine R | 34 |

Various dispersing agents may be used although triethanolamine and trisodium phosphate have been found to give very good results. In addition to acting as a dispersing agent the trisodium phosphate is quite effective in preventing formation of crystals, thereby aiding greatly in maintaining the solution in colloidal form.

Binders which have been found suitable in carrying out the process of this invention are preserver's syrup, casein, cane sugar, molasses, dextrine, gelatin, and cellulose glycollate. In fact, almost any water-soluble, neutral, organic compound, noncrystalline in form, which commonly serves as a protective colloid, may be used.

The products produced by the process of this invention are characterized by unusual stability, great strength, ready dispersibility, non-dusting tendency, beautiful glistening scales, flakes, or platelets, and when treated with water or other solvents by extremely rapid solubility. Since these products have unusual stability and strength they do not deteriorate to any appreciable extent on storage, and therefore are very satisfactory from a commercial point of view. In addition to the advantages resulting from the unusual stability and strength of the product there is a noticeable advantage due to the much shorter time required to make a solution of given strength, and the freedom from objectionable dust, because of the ease with which these scales, flakes, or platelets enter solution, and their non-dusting properties.

As many apparently widely different embodiments of this invention may be made without departing from the spirit and scope thereof, it is to be understood that we do not limit ourselves to the foregoing examples or descriptions except as indicated in the following claims.

We claim:

1. A method of producing an azo dye in the form of relatively hard, shiny flakes which comprises coupling tetrazo benzidine, H-acid, diazo benzene, and m-phenylene diamine, removing salt from the dyestuff, slurrying the dyestuff in water with caustic soda, triethanolamine, and trisodium phosphate, drying on a drum drier, and scraping off the drum in the form of flakes.

2. A method of producing an azo dye in the form of relatively hard, shiny flakes which comprises preparing an azo dye, removing salt from the dyestuff, slurrying the dyestuff in water with caustic soda and a binding, dispersing agent comprising triethanolamine, and drying on a drum drier.

3. A method of producing an azo dye in the form of relatively hard, shiny flakes which comprises preparing an azo dyestuff relatively free from impurities, slurrying the dyestuff in water with triethanol amine, and drying in a layer.

4. A method of producing an azo dye in the form of relatively hard, shiny flakes which comprises slurrying an azo dyestuff with triethanolamine and a sugary substance, and drying.

5. A dyestuff containing an azo dye identified as Schultz 462 substantially free of salt from the mother liquor, a binding agent comprising triethanolamine, and a dispersing agent comprising trisodium phosphate, and being in the form of relatively hard, shiny flakes.

6. A dyestuff containing an azo dye substantially free from salt, trisodium phosphate, and triethanolamine, and being in the form of hard, shiny flakes.

7. A dyestuff containing an azo dye, and triethanolamine, and being in the form of hard, shiny flakes.

WILLIAM S. CALCOTT.
FRANCIS H. SMITH.
GEORGE BARNHART.